No. 843,636. PATENTED FEB. 12, 1907.
E. SIMMONS.
POST MAUL.
APPLICATION FILED OCT. 18, 1906.
2 SHEETS—SHEET 1.
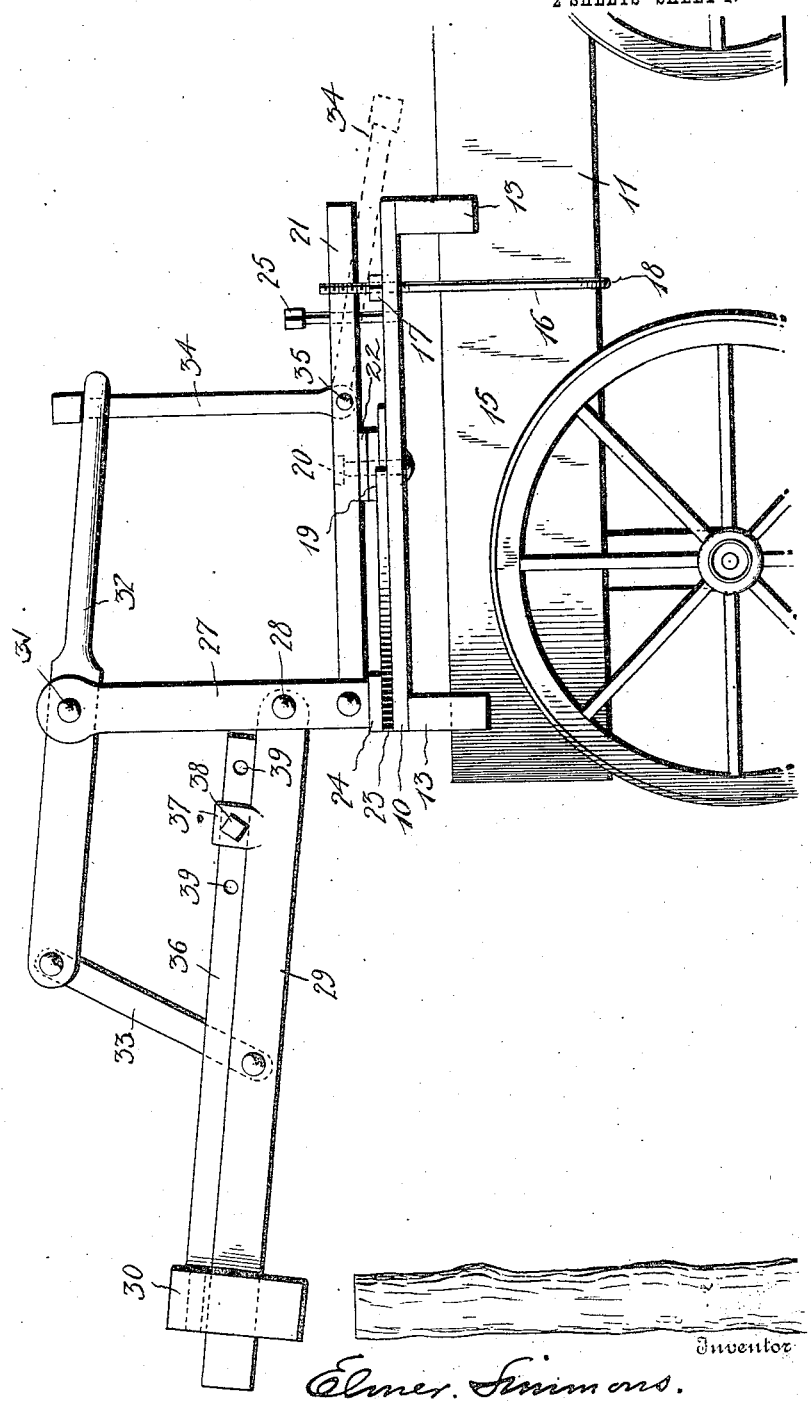
Witnesses
Jas. A. Koebel.
M. A. Schmidt
Inventor
Elmer Simmons.
By Milo B. Stevens & Co.
Attorneys

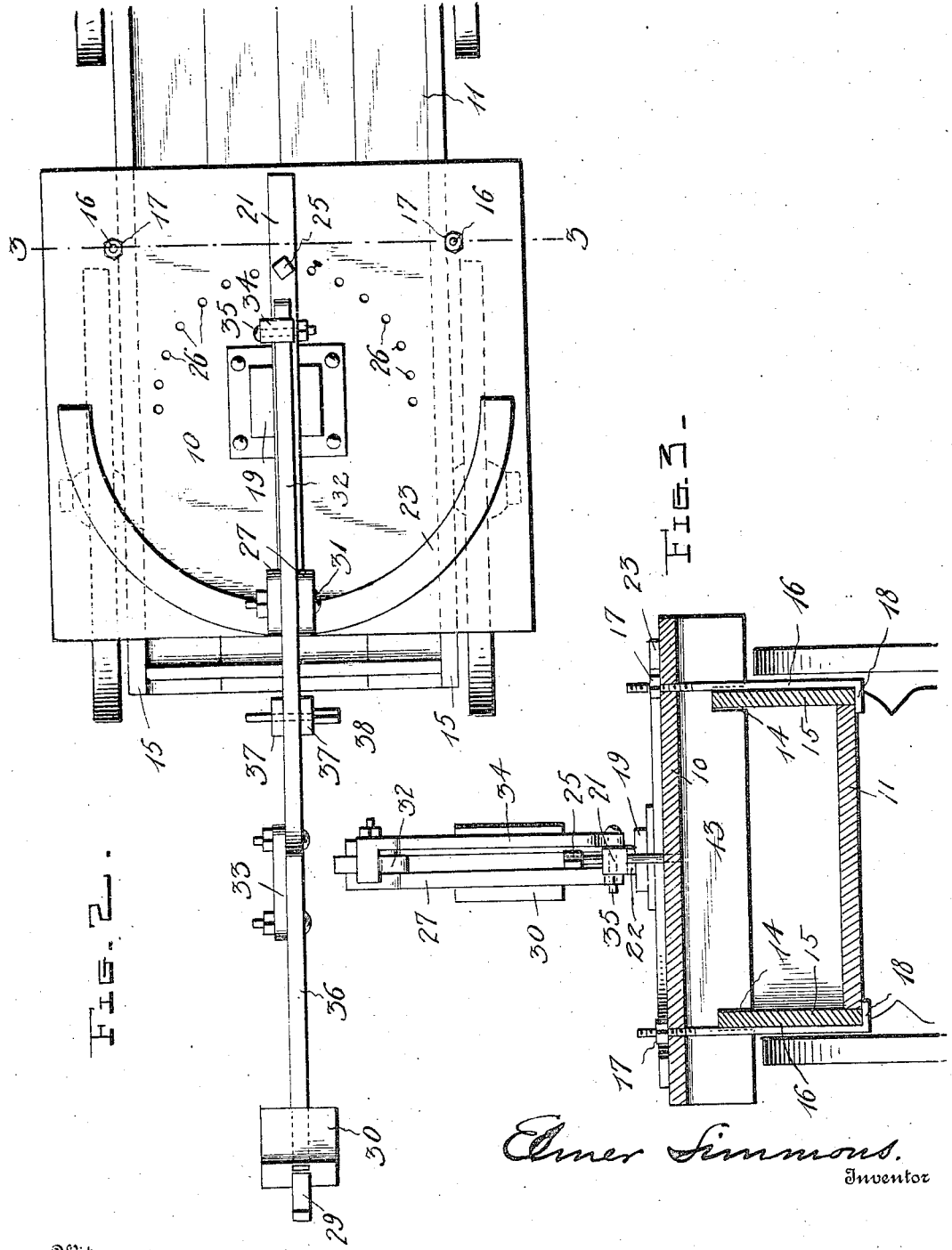

UNITED STATES PATENT OFFICE.

ELMER SIMMONS, OF TURNERS, MISSOURI.

POST-MAUL.

No. 843,636.

Specification of Letters Patent.

Patented Feb. 12, 1907.

Application filed October 18, 1906. Serial No. 339,468.

*To all whom it may concern:*

Be it known that I, ELMER SIMMONS, a citizen of the United States, residing at Turners, in the county of Greene and State of Missouri, have invented new and useful Improvements in Post-Mauls, of which the following is a specification.

This invention is a post-maul, and has for its object to provide a simple and efficient implement for driving fence-posts into the ground.

A further object is to provide a maul which can be readily transferred from one post to another, means being provided for mounting the implement on a wagon, from which it is also operated.

In the accompanying drawings, Figure 1 is an elevation of the invention. Fig. 2 is a plan view. Fig. 3 is a transverse section on the line 3 3 of Fig. 2.

Referring specifically to the drawings, 10 denotes a platform which carries the maul and its operating mechanism. The platform is mounted on an ordinary farm-wagon 11, from which it is operated. At opposite ends of the platform are sills 13, which extend across and are supported on the wagon-box, said sills having notches 14, into which the side boards 15 of the wagon-box extends, whereby the sills are prevented from slipping off sidewise. The front end of the platform is held down by rods 16, extending through the platform, above which they are threaded to receive fastening-nuts 17, and below the platform the rods are formed into hooks 18, which engage over any suitable fixed part of the wagon.

At or about the center of the platform is secured a block 19, on which is pivoted, as at 20, to swing in a horizontal plane, an arm 21. The under side of the arm is fitted with a rub-iron 22. On the platform is a semicircular track 23, which supports one end of the arm 21, said end being fitted with a shoe 24, engageable with the track. The opposite end of the arm has a vertical opening to receive a pin 25, which is extensible into one of a series of holes 26 in the platform, said holes being arranged in a semicircular row.

At 27 is indicated a pair of uprights which rise from that part of the arm which is supported on the track 23. Between these uprights is pivoted, as at 28, the handle 29, on which the maul-head 30 is slidably mounted. The platform is placed near the rear end of the wagon, so that the maul will extend from said end.

Above the pivot 28 is a pivot 31 for the operating-lever 32 of the maul, said lever also extending between the uprights 27. One end of the lever is connected by a link 33 to the handle 29, and the other end of the lever is engageable by a holder 34, pivoted, as at 35, to the arm 21. This holder serves to retain the maul in elevated position. The maul is dropped by swinging the holder 34 away from the lever 32, as shown by dotted lines in Fig. 1, thereby releasing said lever.

To the maul-head 30 is secured an adjusting-rod 36, which extends between cheeks 37 on the handle 29. The rod is adjustably secured by a pin 38, extending through registering openings in the cheeks and through one of a series of openings 39 in the rod. Upon removing the pin 38 the rod can be drawn back or forth to adjust the maul-head on the handle, and after the desired adjustment is made the head is fastened by extending the pin 38 through the openings in the cheeks 37 and one of the openings 39.

In use the wagon is backed up to the post to be driven into the ground. If the wagon is backed too close to the post, the maul-head can be slid back on its handle, and if lateral adjustment of the maul-head is necessary this is readily done by removing the pin 25 and swinging the arm 21 around to bring the maul-head into proper position above the post. The arm is held in adjusted position by extending the pin 25 through the opening in the arm and into one of the holes 26.

I claim—

1. A post-maul comprising a platform, a horizontally-swinging arm pivoted thereon, uprights on the arm, a maul-handle and an operating-lever pivoted to the uprights, and a connection between said handle and lever.

2. A post-maul comprising a platform, a horizontally-swinging arm pivoted thereon, uprights on the arm, a maul-handle and an operating-lever pivoted to the uprights, a link connecting one end of the lever to the maul-handle, and a holder pivoted to the arm and engageable with the other end of the lever.

3. The combination with a handle, of a maul-head slidable lengthwise thereon, an adjusting-rod secured to the maul-head, and means for holding the rod in adjusted position.

In testimony whereof I have signed my name to this specification in the presence of two subscribing witnesses.

ELMER SIMMONS.

Witnesses:
JAMES BAIR,
JACOB B. GAULT.